United States Patent
Rykowski

(10) Patent No.: US 11,849,008 B2
(45) Date of Patent: Dec. 19, 2023

(54) PER-APPLICATION NETWORK CONTENT FILTERING

(71) Applicant: AirWatch LLC, Atlanta, GA (US)

(72) Inventor: Adam Rykowski, Atlanta, GA (US)

(73) Assignee: AirWatch, LLC, Atlanta, GA (US)

(*) Notice: Subject to any disclaimer, the term of this patent is extended or adjusted under 35 U.S.C. 154(b) by 0 days.

(21) Appl. No.: 18/079,538

(22) Filed: Dec. 12, 2022

(65) Prior Publication Data

US 2023/0115656 A1  Apr. 13, 2023

Related U.S. Application Data

(63) Continuation of application No. 17/216,140, filed on Mar. 29, 2021, now Pat. No. 11,558,490, which is a continuation of application No. 16/201,207, filed on Nov. 27, 2018, now Pat. No. 10,986,210, which is a continuation of application No. 14/840,895, filed on Aug. 31, 2015, now Pat. No. 10,182,130.

(51) Int. Cl.
*G06F 15/16* (2006.01)
*H04L 67/63* (2022.01)
*H04L 67/141* (2022.01)
*H04W 4/50* (2018.01)
*H04L 12/46* (2006.01)

(52) U.S. Cl.
CPC ........ *H04L 67/63* (2022.05); *H04L 12/4625* (2013.01); *H04L 67/141* (2013.01); *H04W 4/50* (2018.02)

(58) Field of Classification Search
None
See application file for complete search history.

(56) References Cited

U.S. PATENT DOCUMENTS

| | | | |
|---|---|---|---|
| 7,225,249 B1 * | 5/2007 | Barry | G06F 16/958 709/227 |
| 2011/0023090 A1 * | 1/2011 | Asati | H04L 12/4633 726/4 |
| 2014/0003269 A1 | 1/2014 | Golitschek Edler Von Elbwart et al. | |
| 2014/0094159 A1 | 4/2014 | Raleigh et al. | |

* cited by examiner

*Primary Examiner* — Wing F Chan
*Assistant Examiner* — Andrew Woo
(74) *Attorney, Agent, or Firm* — Thomas | Horstemeyer, LLP

(57) ABSTRACT

Disclosed are various examples for providing network content filtering to client devices on a per-application basis. A client device is identified. Then the client device is authenticated by the device management service. If the client device is not authenticated, a user interface will facilitate the enrollment process on the client device to authenticate the client device with the management service. Then, an authentication token is received. The management application receives a request from an application to initiate a network connection. Based at least in part on the identity of the application and the client device, the management application routes network traffic associated with the application and the network connection using or without using a managed network tunnel.

20 Claims, 5 Drawing Sheets

PER-APPLICATION NETWORK CONTENT FILTERING

CROSS-REFERENCE TO RELATED APPLICATIONS

This application is a continuation of, and claims priority to, and the benefit of, U.S. patent application Ser. No. 17/216,140, entitled "PER-APPLICATION NETWORK CONTENT FILTERING" and filed on Mar. 29, 2021, which is a continuation of U.S. patent Ser. No. 16/201,207, entitled "PER-APPLICATION NETWORK CONTENT FILTERING" and filed on Nov. 27, 2018, which is a continuation of U.S. patent Ser. No. 14/840,895, entitled "PER-APPLICATION NETWORK CONTENT FILTERING" and filed on Aug. 31, 2015, each of which is incorporated by reference as if set forth herein its entirety.

BACKGROUND

A goal for enterprise mobile management of mobile computing devices is to allow any application to be enterprise ready. With enterprise-ready applications, the enterprise is able to control the flow of data and keep data within the enterprise. Operating system vendors already provide functionality that enables controlling the data flow from application to application. For example, it is possible to prevent a document created by a first application from being opened in a second application on a mobile device. However, currently there is no approach to control the network services to which a given application connects. Consequently, a user can connect the first application to a network service and transfer the document to the network service.

Existing approaches to filtering network content work on a per-device level rather than a per-application level. That is to say, all of the network traffic from a given device can be intercepted and filtered by devices attached to the network. However, such approaches can function only for enterprise-owned devices or devices attached to an enterprise network. They are not suited for "bring your own device" (BYOD) environments, which are becoming increasingly popular.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing network content filtering on a per-application basis. In the context of managed mobile devices, it can be important to limit access to network services for one or more applications to comply with enterprise terms of use. In some cases, enterprise network administrators seek to limit access of applications to objectionable content. In other cases, the administrators seek to prevent exfiltration of sensitive data from the application. Thus, it can be desirable to limit incoming data and/or outgoing data with respect to applications and network services.

Device-level filtering approaches can be employed. That is to say, content filtering can be applied to all data coming or going from a mobile device. Device-level filtering approaches can include filtering in the device or filtering in the network. Filtering in the device can be problematic for devices that are not enterprise-owned devices, as the filtering applies to every application on the device, even unmanaged applications. Filtering in the network can work for an enterprise network, but not for public networks or networks not under control of the enterprise.

Various examples of the present disclosure introduce approaches for per-application content filtering through the selective use of managed network tunnels. The network stack of a mobile device is configured to determine the identity of the application, and depending on the identity of the application, open a requested network connection through a managed network tunnel or open the requested network connection directly without a managed network tunnel. In the managed network tunnel, the network traffic is routed to a content filtering service that implements network-level content filtering. For example, traffic from managed applications can be routed through the managed network tunnel, while traffic from unmanaged applications can be directly routed as normal. This allows a user's personal, unmanaged applications to have unfiltered network access, while still enforcing enterprise rules upon other applications, such as managed applications. In addition, the approaches described herein do not require the code of the applications to be modified. That is, the use of a specific software development kit (SDK) to support filtering is not required to implement content filtering as will be described.

Figure 1:
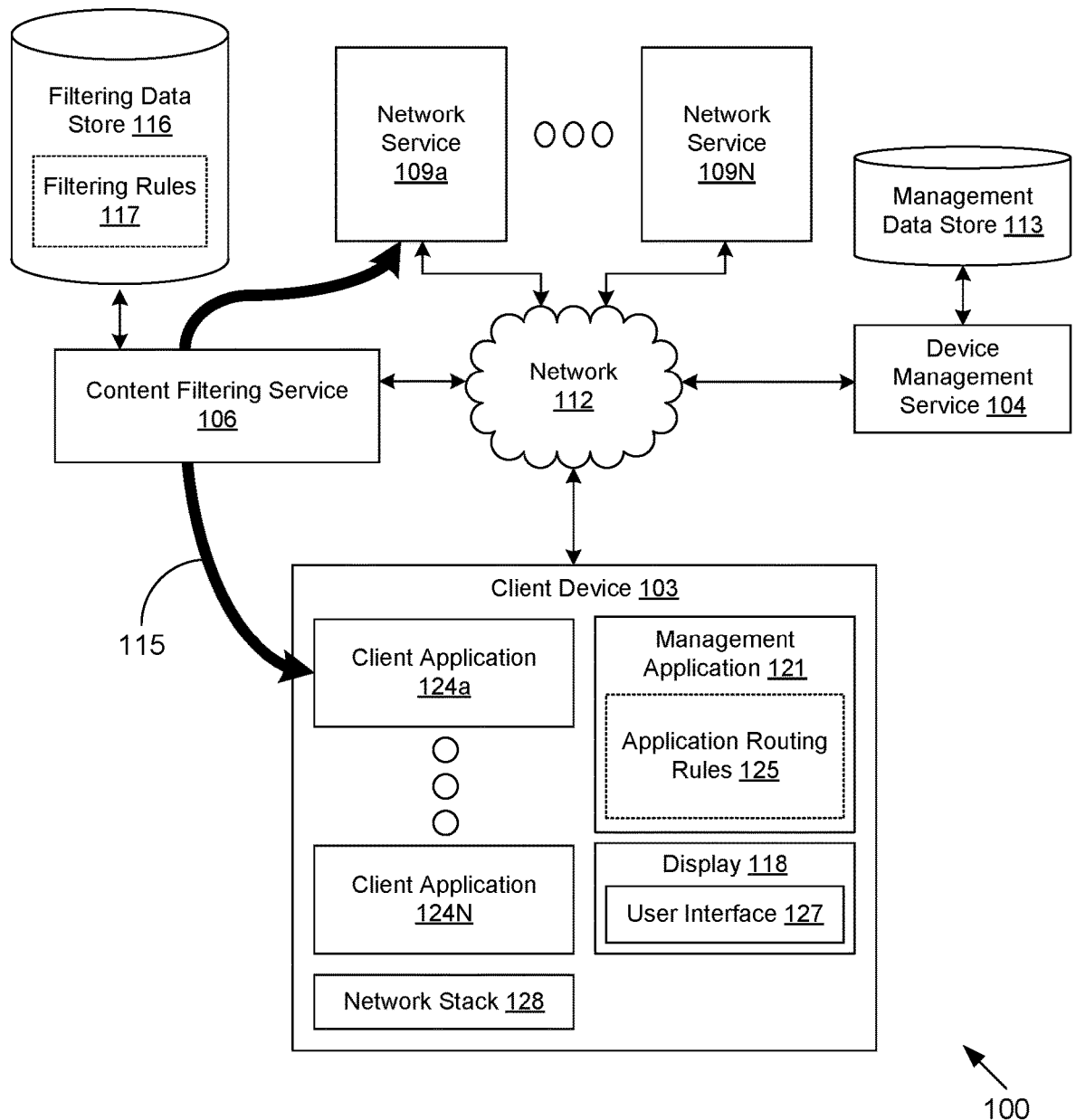
FIG. 1 is a drawing of a networked environment according to various examples of the disclosure.

With reference to FIG. 1, shown is a networked environment 100 according to various examples. The networked environment 100 includes a client device 103, a device management service 104, a content filtering service 106, and a plurality of network services 109a ... 109N, which can be in data communication with one another over the network 112. The network 112 includes, for example, the Internet, one or more intranets, extranets, wide area networks (WANs), local area networks (LANs), wired networks, wireless networks, other suitable networks, or any combination of two or more networks. For example, the networks can include satellite networks, cable networks, Ethernet networks, and other types of networks.

The device management service 104, the content filtering service 106, and the network services 109 can include, for example, a server computer or any other system providing computing capabilities. Alternatively, the device management service 104, the content filtering service 106, and the network services 109 can employ multiple computing devices that can be arranged, for example, in one or more server banks, computer banks, or other arrangements. The computing devices can be located in a single installation or can be distributed among many different geographical locations. For example, the device management service 104, the content filtering service 106, and the network services 109 can include multiple computing devices that together form a hosted computing resource, a grid computing resource, or any other distributed computing arrangement. In some cases, the device management service 104, the content filtering service 106, and the network services 109 can operate as at least a portion of an elastic computing resource where the allotted capacity of processing, network, storage, or other computing-related resources can vary over time. The device management service 104, the content filtering service 106, and the network services 109 can also include or be operated as one or more virtualized computer instances. Generally, the device management service 104, the content filtering service 106, and the network services 109 can be operated in accordance with particular security protocols such that they are considered trusted computing environments. The device management service 104, the content filtering service 106, and the network services 109 can be located remotely with respect to the client device 103.

The device management service 104 can manage or oversee the operation of multiple client devices 103. In some examples, an enterprise, such as one or more companies or other organizations, can operate the device management service 104 to oversee or manage the operation of the client devices 103 of employees, contractors, or other users within an enterprise environment. In this sense, the client devices 103 can include managed devices that are managed by the device management service 104.

The client device 103 can be enrolled as a managed device with the device management service 104 through APIs provided by the operating system. The enrollment process can include authentication of a user's credentials. Upon authentication of a user's credentials by the device management service 104, the client device 103, using device management APIs of the operating system, can enroll the client device 103 as a managed device so that various management functions can be performed by the device management service 104.

Examples of management functions can include commands to erase certain data from the client device 103, commands to install certain applications or application updates, commands to lock a client device 103 or activate a display lock feature, a command to remotely perform a factory reset of the client device 103, or other management functions. Additionally, data can be securely transmitted through the secure communications channel to the client device 103 or applications executed by the client device 103.

Additionally, the operating system of the client device 103 can also provide the ability to create access-restricted storage that is associated with particular applications installed on the client device 103. Access-restricted storage can be associated with multiple applications that are installed on the client device 103 through the secure communications channel. In some scenarios, applications that are signed by a common certificate can be provided access to the access-restricted storage of each other, whereas applications that are not signed by the certificate do not have access to the access-restricted storage of other applications. Additionally, the device management service 104 can transmit data to the client device 103 over the secure communications channel that can be stored in the access-restricted storage such that it is accessible by certain applications and inaccessible to other applications that are installed on the client device 103.

The device management service 104 can also facilitate ensuring that client devices 103 that are administered by the device management service 104 are operating in compliance with various compliance rules. In one scenario, the device management service 104 can issue management commands that instruct a client device 103 to take a particular action with respect to a compliance rule. For example, if a client device 103 is designated as lost or stolen, the device management service 104 can issue a command instructing the client device 103 to erase data and applications that were previously sent to the client device 103 through the secure communications channel or other communication links and otherwise stored on the client device 103. The device management service 104 can also obtain data from a third party computing environment, such as an application, a security code, authentication token, or other data. As another example, if the device management service 104 determines that a client device 103 has violated a compliance rule with respect to having unauthorized modifications or unauthorized applications installed on the client device 103, the device management service 104 can issue a command instructing the client device 103 to erase data and applications stored on the client device 103. As a further example, the device management service 104 can also issue a command instructing the client device 103 to activate a display lock of the client device 103 that requires a user to enter a personal identification number (PIN) in order to use the client device 103.

The data stored in the management data store 113 and available to the device management service 104 includes, for example, authentication data, compliance rules, device data, and potentially other data. The authentication data can include data used to verify one or more security credentials presented by a user for authentication. To this end, secure certificates can be stored and then be made available to the client device 103 that has been authenticated in order to encrypt the secure communications channel and/or for other functions.

Within the context of an enterprise, compliance rules include one or more rules that, when violated, can cause the device management service 104 to issue a management command. Compliance rules can include a list of unauthorized hardware functions, software functions, or applications that potentially pose a threat to enterprise data or to the use of enterprise applications. As noted above, if the client device 103 falls out of compliance with one or more compliance rules, a management command can be transmitted to the client device 103 instructing the client device 103 to perform one or more actions specified by the compliance rule. Alternatively, a compliance rule can also reside on the client device 103, which can self-enforce compliance rules. The management data store 113 can also include user account data. User account data can include information with which a user account can be authenticated, such as user credentials. User account data can also include data such as email, contact, calendar data, documents, files or other data that is associated with a user account.

Device data can represent data stored in the management data store 113 that is associated with client devices 103 that are enrolled with the device management service 104 as managed devices. Device data can include a unique device identifier associated with the client device 103, device policies that are associated with a particular client device 103, status information associated with a particular client device 103, and other data that facilitates management of the client device 103 by the device management service 104. Device data can also include user data that is synchronized with a particular client device 103. A user account can be associated with multiple client devices 103. Different client devices 103 associated with a user account can have different user account data stored thereon. For example, a user's smartphone can have a certain number of documents or email messages stored on the device, whereas the user's laptop or tablet can have varying amounts of types of user account data stored on the device.

The content filtering service 106 can provide content filtering for applications of the client device 103 under management by the device management service 104. Specifically, managed network tunnels 115 can be created between applications on the client device 103 and network services 109 that interpose the content filtering service 106 between the network service 109 and the applications on the client device 103. By having access to the network traffic, the content filtering service 106 is able to filter or block the traffic.

The data stored in the filtering data store 116 and available to the content filtering service 106 includes filtering rules 117 and potentially other data. The filtering rules 117 control the filtering performed by the content filtering service 106 for specific client devices 103, applications, and network services 109. The filtering rules 117 can be expressed in terms of a whitelist and/or a blacklist. With a whitelist, only traffic permitted according to terms of the whitelist is allowed to pass through. By contrast, with a blacklist, any traffic that does not match the blacklist is allowed to pass through. Generally, whitelists are more restrictive than blacklists and can be more successful in blocking undesired traffic before parameters can be added to blacklists.

The network services 109 provide corresponding services for client applications. The services can include, for example, social networking services, email services, voice communication services, enterprise information management services, productivity services, game services, and so on. The network services 109 can communicate with the client device 103 over the network 112 by way of hypertext transfer protocol (HTTP), simple object access protocol (SOAP), representational state transfer (REST), and/or other protocols.

As discussed, network traffic from certain client applications and to certain network services 109 can be routed through the content filtering service 106 by way of a managed network tunnel 115. The managed network tunnel 115 can correspond to an application-layer tunnel, a transport-layer tunnel, a network layer tunnel, or another type of tunnel. The managed network tunnel 115 can be encrypted using secure sockets layer (SSL), transport layer security (TLS), internet protocol security (IPsec), and/or other technologies. The managed network tunnel 115 can correspond to a virtual private network (VPN) tunnel.

The client device 103 can represent a processor-based system, such as a computer system, that can be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 103 can include a display 118 that includes, for example, one or more devices such as liquid crystal display (LCD) displays or other types of display devices. The client device 103 can also be equipped with networking capability or networking interfaces, including a localized networking or communication capability such as an NFC capability, RFID read and/or write capability, a microphone and/or speaker, or other localized communication capability.

The client device 103 can execute various applications, such as a management application 121, a plurality of client applications 124a . . . 124N, and other applications, services, or processes. The management application 121 can receive security credentials from a user and to authenticate with the device management service 104. Although described as an application, it is understood that the management application 121 can be an integral component of an operating system of the client device 103. The management application 121 can be configured by configuration profile data from the device management service 104 to enforce one or more application routing rules 125 upon various ones of the client applications 124. For example, the management application 121 can be configured to enforce application routing rules 125 on client applications 124 that are managed. The application routing rules 125 can control which network traffic from the client device 103 is to be routed within one or more managed network tunnels 115 based at least in part on the identity of the client application 124, the identity of the network service 109, and/or other factors.

The client applications 124 correspond to a variety of applications that are employed to access services provided by the network services 109. The client applications 124 can include a web view component, whereby the client applications 124 interact with the network services 109 to obtain network content by way of hypertext transfer protocol (HTTP) requests and responses. Alternatively, the client applications 124 can communicate with the network services 109 using user datagram protocol (UDP), real-time transport protocol (RTP), and/or other protocols. The client applications 124 and the management application 121 can individually render a respective user interface 127 upon the display 118.

The client device 103 also includes a network stack 128 that facilitates communication between a client application 124 and the network 112. The network stack 128 can correspond to a transmission control protocol/internet protocol (TCP/IP) stack or another form of stack. The network stack 128 can be under control of the operating system of the client device 103 and can be configured at least in part by the application routing rules 125 enforced by the management application 121. As will be described, the network stack 128 receives requests to connect to network services 109 by the client applications 124. Based at least in part on the application routing rules 125, the network stack 128 determines whether to route the connection directly to the network service 109 over the network 112 or to route the connection to the content filtering service 106 using a managed network tunnel 115.

Figure 2:
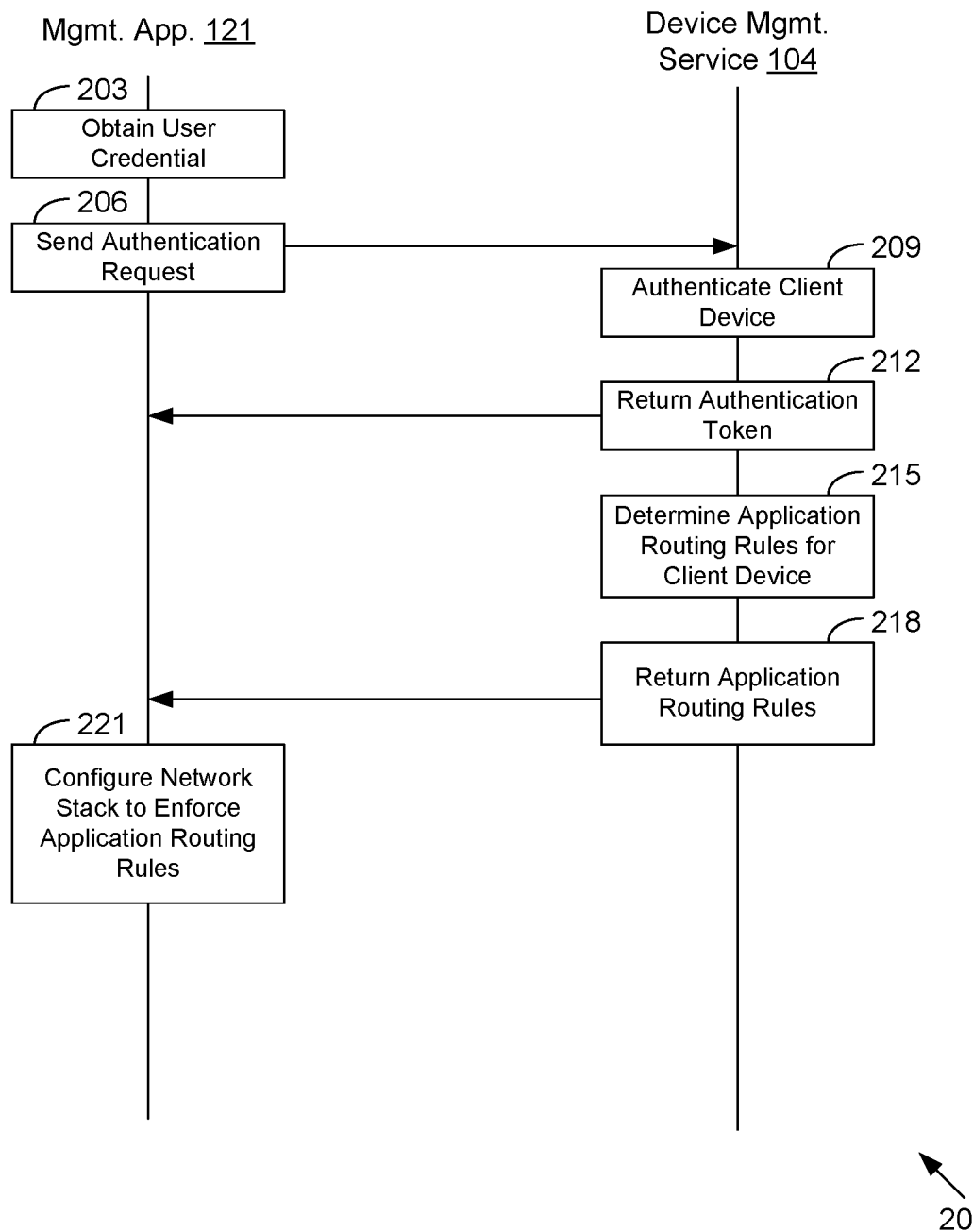
FIGS. 2 and 3 are sequence diagrams illustrating example component interactions according to various examples of the present disclosure.

Continuing now to FIG. 2, shown is a sequence diagram 200 illustrating one example of interaction between the management application 121 and the device management service 104. The separation or segmentation of functionality as discussed herein is presented for illustrative purposes only.

Beginning with step 203, the management application 121 obtains a user security credential from a user. The credential can correspond to a username and password, biometric identifiers, secure certificates, or a plurality of credentials in a multi-factor authentication environment. At step 206, the management application 121 sends an authentication request over the network 112 to the device management service 104. At step 209, the device management service 104 authenticates the client device 103 by confirming the credentials provided. At step 212, the device management service 104 returns an authentication token to the client device 103 over the network 112 that can be used subsequently to confirm that authentication has occurred.

At step 215, the device management service 104 determines one or more application routing rules 125 that apply to the client device 103 and/or client applications 124 executed in the client device 103. At step 218, the device management service 104 returns the application routing rules 125 and/or other configuration profile data to the client device 103 over the network 112. At step 221, the management application 121 configures the network stack 128 to enforce the application routing rules 125 for client applications 124 executed in the client device 103.

Figure 3:
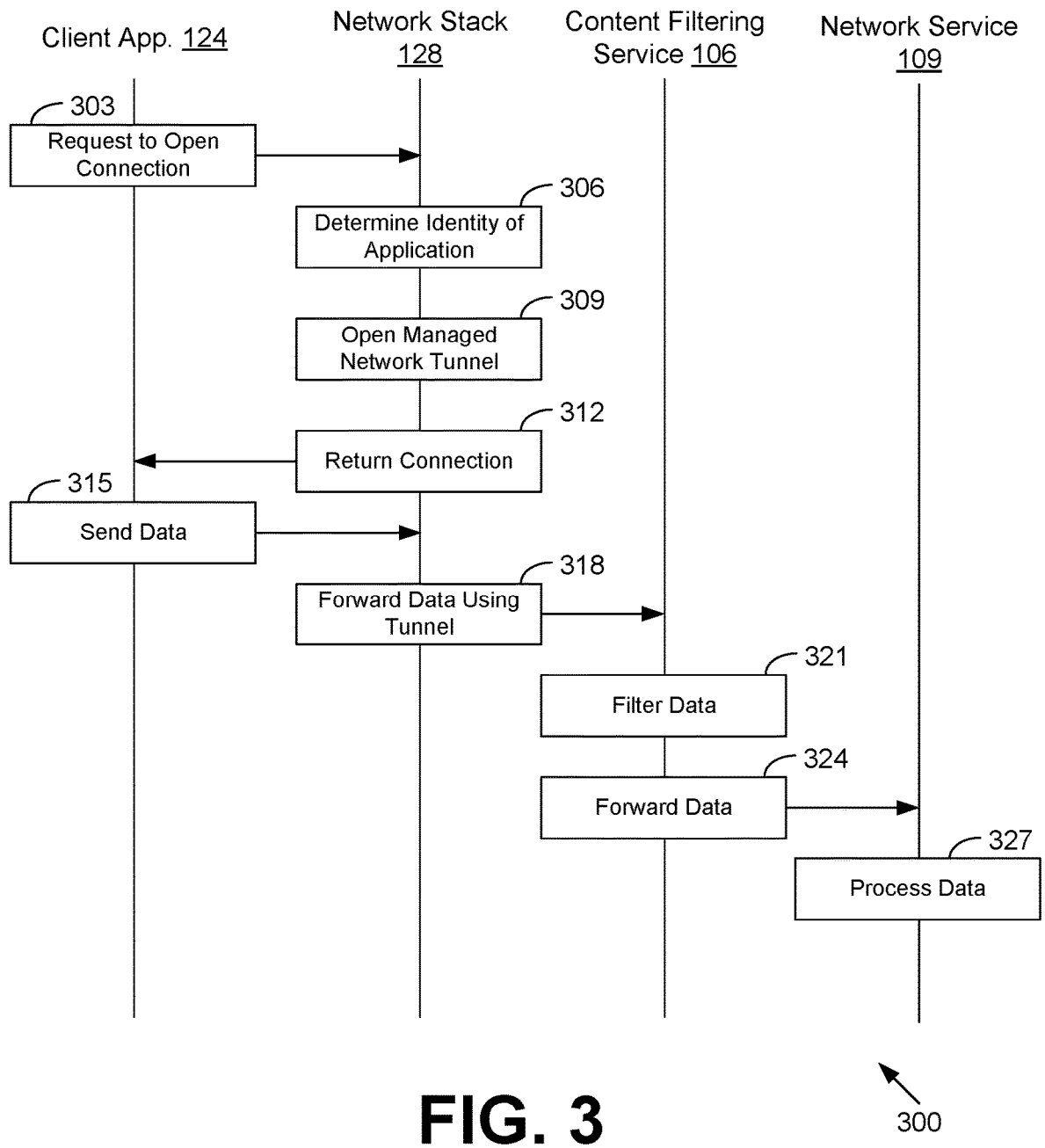

Turning now to FIG. 3, shown is a sequence diagram 300 illustrating one example of interaction between the client application 124, the network stack 128, the content filtering service 106, and the network service. The separation or segmentation of functionality as discussed herein is presented for illustrative purposes only.

Beginning with step 303, the client application 124 sends a request to open a network connection to the network stack 128. For example, the client application 124 can generate a system call that is intercepted by the network stack 128, which can be executed as an operating system process. At step 306, the network stack 128 determines the identity of the client application 124. Specifically, the network stack 128 can determine, according to the application routing rules 125, that a client application 124 is a managed application and is subject to content filtering. In some cases, whether a particular client application 124 is subject to content filtering can depend on a specific network service 109 to which the client application 124 desires to connect.

At step 309, the network stack 128 opens a managed network tunnel 115 from the client device 103 to the network service 109 by way of the content filtering service 106. At step 312, the network stack 128 returns the connection or an identifier for the connection to the client application 124. At step 315, the client application 124 begins sending data through the connection. In this regard, the client application 124 can make a system call to send the data using the identifier of the connection. At step 318, the network stack 128 forwards the data received from the client application 124 to the content filtering service 106 by way of the managed network tunnel 115.

At step 321, the content filtering service 106 filters the data based at least in part on filtering rules 117. This can include applying a whitelist and/or blacklist with respect to an identifier of the client device 103, an identifier of the client application 124, an identifier of the network service 109 (e.g., an internet protocol (IP) address, a port number, etc.), the payload data, and/or other connection-specific parameters. The content filtering service 106 can decide to forward or reject the data. In this instance, at step 324, the content filtering service 106 decides to forward the data to the network service 109. At step 327, the network service 109 processes the data. Subsequently, the network service 109 can return data to the client application 124 through the managed network tunnel 115. This reverse direction communication can be subject to filtering by the content filtering service 106 as well, based at least in part on the filtering rules 117.

Figure 4:
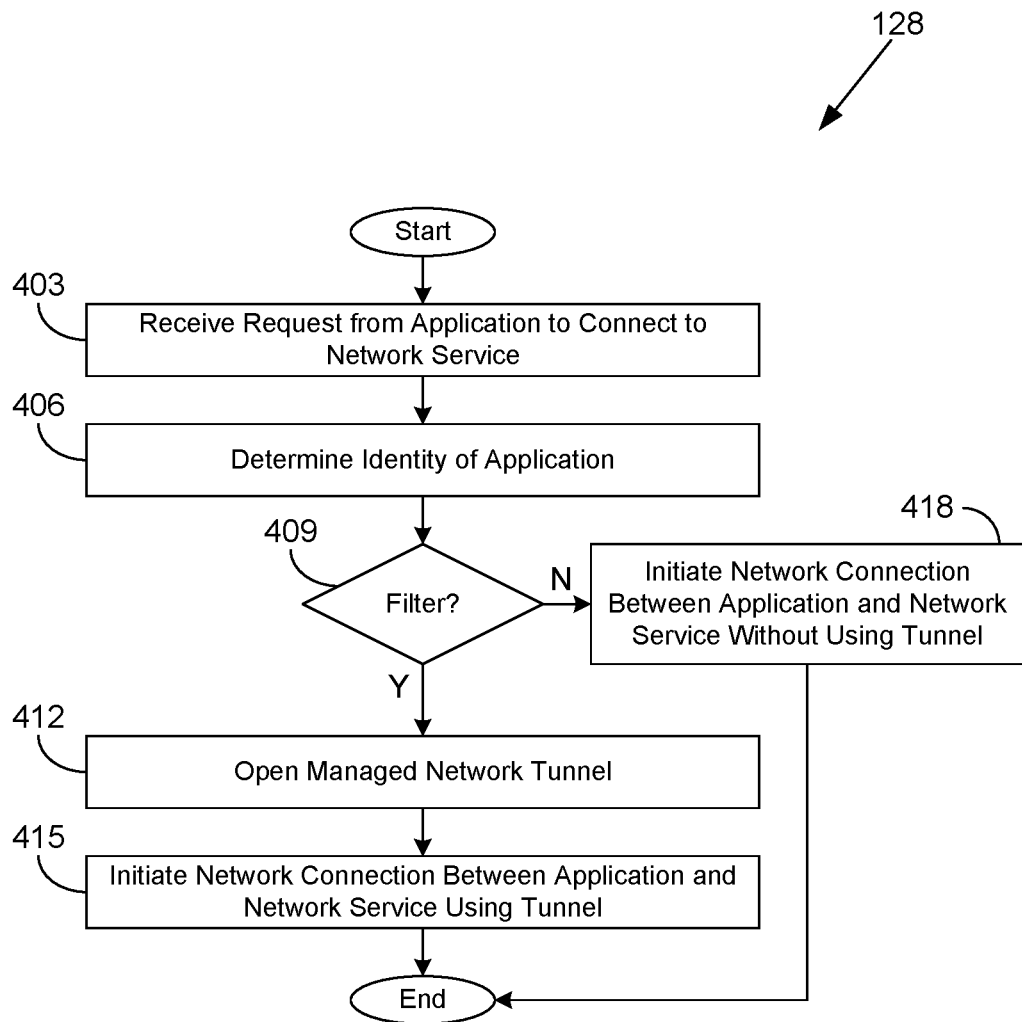
FIGS. 4 and 5 are flowcharts illustrating examples of functionality according to various examples of the present disclosure.

Moving on to FIG. 4, shown is a flowchart that provides one example of the operation of a network stack 128. Functionality attributed to the network stack 128 can be implemented in a single process or application or in multiple processes or applications. The separation or segmentation of functionality as discussed herein is presented for illustrative purposes only.

Beginning with step 403, the network stack 128 receives a request from a client application 124 to connect to a particular network service 109. For example, the network stack 128 can receive a system call from the client application 124 that can identify a destination network address, a destination port, a protocol, and/or other information. This can correspond to a socket connection request. At step 406, the network stack 128 determines the identity of the client application 124 that originated the connection request. At step 409, the network stack 128 makes a determination as to whether the connection is to be filtered. This determination can be made with reference to the application routing rules 125 established by the management application 121. The determination can depend on the identity of the client application 124, the identity of the network service 109, a requested uniform resource locator (URL), and/or other parameters.

If the network stack 128 determines that the connection is to be filtered, the network stack 128 continues from step 409 to step 412 and opens a managed network tunnel 115 between the client device 103 and the network service 109 through the content filtering service 106. In this regard, the network stack 128 can create a virtual private network (VPN) tunnel whereby traffic from the client application 124 is routed to the content filtering service 106. Thus, the network stack 128 can send a request to the content filtering service 106 through the network 112, and the request can specify an identifier of the client application 124 among other information. The content filtering service 106 can then decide whether or not to pass data to or from the network service 109. In this regard, the content filtering service 106 can act as a proxy. The network stack 128 can provide an identifier of the client application 124 to the content filtering service 106. At step 415, the network stack 128 initiates a network connection between the client application 124 and the network service 109 using the managed network tunnel 115. The network stack 128 can then return a handle to the connection to the client application 124. Thereafter, the process proceeds to completion.

If at step 409 the network stack 128 determines that the connection is not to be filtered, the network stack 128 continues from step 409 to step 418. At step 418, the network stack 128 initiates a network connection directly from the client application 124 to the network service 109 without using a managed network tunnel 115. Thus, no filtering by the content filtering service 106 is performed. The network stack 128 can then return a handle to the connection to the client application 124. Thereafter, the process proceeds to completion.

Figure 5:
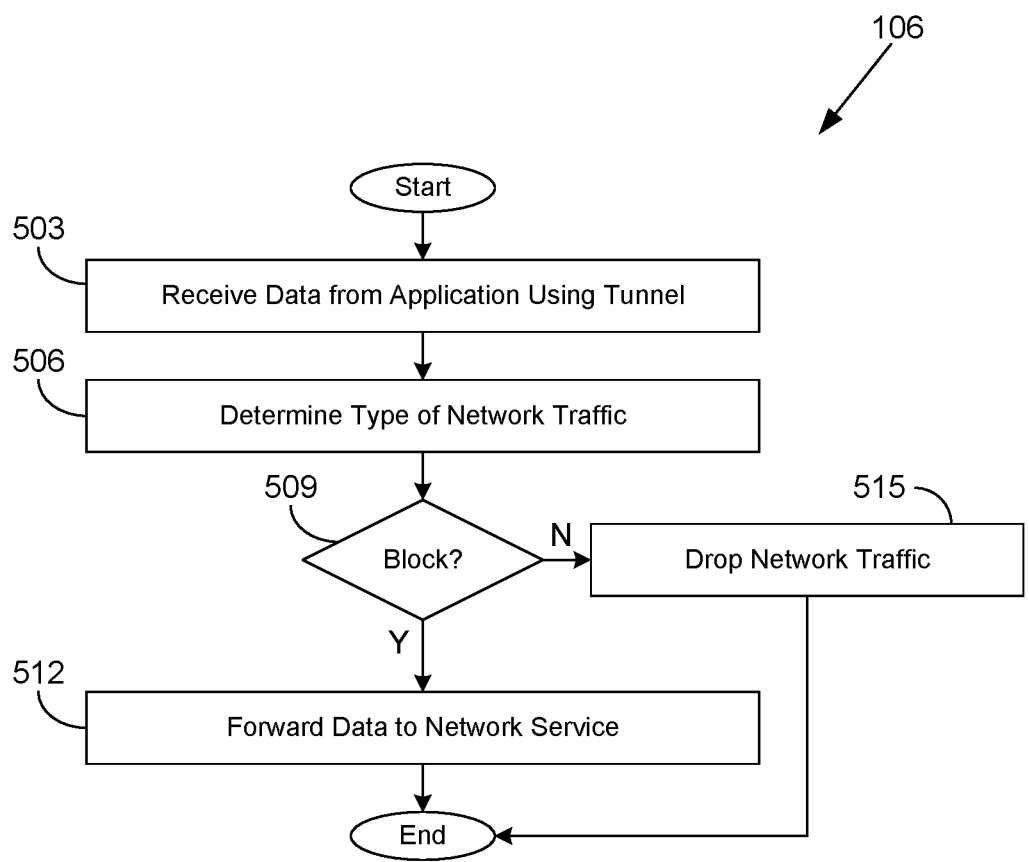

Continuing on to FIG. 5, shown is a flowchart that provides one example of the operation of a content filtering service 106. The content filtering service is configured to selectively provide network access between the client device 103 and the network service 109 based at least in part on the identity of the client application 124, the identity of the network service 109, a requested uniform resource locator (URL), and/or other parameters. Functionality attributed to the content filtering service 106 can be implemented in a single process or application or in multiple processes or applications. The separation or segmentation of functionality as discussed herein is presented for illustrative purposes only.

Beginning with step 503, the content filtering service 106 receives data from a client application 124 using a managed network tunnel 115. The data can be associated with various identifying parameters that identify the client application 124, the network service 109 to which the data is to be sent, the type of data, and so on. At step 506, the content filtering service 106 determines the type of network traffic from these identifying parameters. At step 509, the content filtering service 106 determines whether to block the network traffic. For example, the content filtering service 106 can determine from the filtering rules 117 whether the network traffic matches a rule from a whitelist or a blacklist. If it matches a blacklist rule, the traffic is rejected. If it matches a whitelist rule, the traffic is allowed to pass. If whitelisting is used and the traffic does not match a whitelist rule, the traffic is rejected.

If the content filtering service 106 determines to pass the traffic, the content filtering service 106 forwards the data to the network service 109 through the network 112 in step 512. Return data from the network service 109 to the client application 124 can be similarly forwarded. Thereafter, the process proceeds to completion.

If the content filtering service 106 determines not to pass the traffic, the content filtering service 106 continues from step 509 to step 515 and drops the network traffic. In some implementations, the content filtering service 106 can be configured to monitor behavior of client applications 124 and block network traffic if it corresponds to unusual or unapproved behavior. In some cases, the content filtering service 106 can return an error message (e.g., a web page including an error) to the client application 124. Thereafter, the process proceeds to completion.

The flowcharts of FIGS. 4 and 5 and the sequence diagrams of FIGS. 2 and 3 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagrams show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 103, the content filtering service 106, the network service 109, the device management service 104, or other components described herein can include at least one processing circuit. The processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the content filtering service 106, the network services 109, the device management service 104, the management application 121, the client applications 124, the network stack 128, and/or other components can be stored in one or more storage devices and be executable by one or more processors. Also, a data store, such as the filtering data store 116 or the management data store 113 can be stored in the one or more storage devices.

The content filtering service 106, the network services 109, the device management service 104, the management application 121, the client applications 124, the network stack 128, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A system, comprising:
   a computing device comprising a processor and a memory;
   a management application comprising a first set of machine-readable instructions stored in the memory that, when executed by the processor, cause the computing device to at least:
   determine an identity of a client device;
   authenticate the client device with a device management service,
   in response to the determination that the client device is not managed, generate a user interface on the client device to facilitate an enrollment process to authenticate the client device with the device management service;
   receive, based at least in part on the identity of the client device, an authentication token from the device management service;
   receive a request from an application to initiate a network connection;
   determine an identity of the application on the client device;

establish the network connection based at least in part on the identity of the client device and the application; and route network traffic associated with the application through the network connection.

2. The system of claim 1, wherein the request is a first request, the application is a first application, the network connection is a first network connection, and the machine-readable instructions are further configured to cause the computing device to at least:

receive a second request from a second application to initiate a second network connection;

determine an identity of the second application on the client device;

establish the second network connection based at least in part on the identity of the client device and the second application; and route network traffic associated with the second application through the second network connection.

3. The system of claim 1, wherein the network traffic associated with the application is directed to a managed network tunnel based at least in part on the identity of the application and a network routing rule from the device management service.

4. The system of claim 3, wherein the managed network tunnel is encrypted.

5. The system of claim 1, wherein the network traffic associated with the application is directed through a VPN connection.

6. The system of claim 5, wherein the VPN connection is encrypted using at least one of a version of the transport layer security (TLS) protocol or a version of the internet protocol security (IPSec) protocol.

7. The system of claim 1, wherein the management application is configured to at least:

receive one or more application routing rules from the device management service; and filter the network traffic based at least in part on the identity of the application and the one or more application routing rules.

8. A method comprising:

determining an identity of a client device;

authenticating the client device with a device management service, in response to the determining that the client device is not managed, generating a user interface on the client device to facilitate an enrollment process to authenticate the client device with the device management service;

receiving, based at least in part on the identity of the client device, an authentication token from the device management service;

receiving a request from an application to initiate a network connection;

determining an identity of the application on the client device;

establishing a network connection based at least in part on the identity of the client device and the application; and routing network traffic associated with the application through the network connection.

9. The method of claim 8, wherein the request is a first request, the application is a first application, the network connection is a first network connection, and the method further comprises:

receiving a second request from a second application to initiate a second network connection;

determining an identity of the second application on the client device;

establishing the second network connection based at least in part on the identity of the client device and the second application; and routing network traffic associated with the second application through the second network connection.

10. The method of claim 8, further comprising directing the network traffic associated with the application to a managed network tunnel based at least in part on the identity of the application and a network routing rule from the device management service.

11. The method of claim 10, wherein the managed network tunnel is encrypted.

12. The method of claim 8, further comprising directing the network traffic associated with the application through a VPN connection.

13. The method of claim 12, wherein the VPN connection is encrypted using at least one of a version of the transport layer security (TLS) protocol or a version of the internet protocol security (IPSec) protocol.

14. The method of claim 8, further comprising:

receiving one or more application routing rules from the device management service; and filtering the network traffic based at least in part on the identity of the application and the one or more application routing rules.

15. A non-transitory, computer-readable medium comprising machine-readable instructions that, when executed by a processor, cause a computing device to at least:

determine an identity of a client device;

authenticate the client device with a device management service, in response to the determination that the client device is not managed, generate a user interface on the client device to facilitate an enrollment process to authenticate the client device with the device management service;

receive, based at least in part on the identity of the client device, an authentication token from the device management service;

receive a request from an application to initiate a network connection;

determine an identity of the application on the client device;

establish a network connection based at least in part on the identity of the client device and the application; and route network traffic associated with the application through the network connection.

16. The non-transitory, computer-readable medium of claim 15, wherein the request is a first request, the application is a first application, the network connection is a first network connection, and the machine-readable instructions are further configured to cause the computing device to at least:

receive a second request from a second application to initiate a second network connection;

determine an identity of the second application on the client device;

establish the second network connection based at least in part on the identity of the client device and the second application; and route network traffic associated with the second application through the second network connection.

17. The non-transitory, computer-readable medium of claim 15, wherein the network traffic associated with the application is directed to a managed network tunnel based at least in part on the identity of the application and a network routing rule from the device management service.

18. The non-transitory, computer-readable medium of claim 17, wherein the managed network tunnel is encrypted.

19. The non-transitory, computer-readable medium of claim 15, wherein the network traffic associated with the application is directed through a VPN connection.

20. The non-transitory, computer-readable medium of claim 15, wherein the machine-readable instructions further cause the computing device to at least:
   receive one or more application routing rules from the device management service; and
   filter the network traffic based at least in part on the identity of the application and the one or more application routing rules.

* * * * *